United States Patent
Birkett et al.

(10) Patent No.: US 10,590,311 B2
(45) Date of Patent: Mar. 17, 2020

(54) ACCELERATORS FOR TWO PART CURABLE COMPOSITIONS

(71) Applicants: Henkel Corporation, Rocky Hill, CT (US); Henkel Ireland Limited, Monheim (DE)

(72) Inventors: David P. Birkett, Kildare (IE); Anthony F. Jacobine, Meriden, CT (US); Andrew D. Messana, Newington, CT (US); Joel D. Schall, Hamden, CT (US); David Mullen, Navan Co. Meath (IE); Martin Wyer, Ontario (CA); Lynnette Hurlburt, Manchester, CT (US)

(73) Assignees: Henkel IP & Holding GmbH, Duesseldorf (DE); Henkel AG & Co. KGaA, Duesseldorf (DE)

( * ) Notice: Subject to any disclaimer, the term of this patent is extended or adjusted under 35 U.S.C. 154(b) by 65 days.

(21) Appl. No.: 13/785,477

(22) Filed: Mar. 5, 2013

(65) Prior Publication Data
US 2014/0004354 A1    Jan. 2, 2014

Related U.S. Application Data

(60) Provisional application No. 61/664,789, filed on Jun. 27, 2012.

(51) Int. Cl.
| | | |
|---|---|---|
| *C09J 11/06* | (2006.01) | |
| *B32B 7/12* | (2006.01) | |

(Continued)

(52) U.S. Cl.
CPC .............. *C09J 11/06* (2013.01); *B32B 7/12* (2013.01); *C08F 220/18* (2013.01); *C08K 5/405* (2013.01); *C09J 4/00* (2013.01); *C09J 133/14* (2013.01); *Y10T 428/31551* (2015.04); *Y10T 428/31935* (2015.04)

(58) Field of Classification Search
CPC .. C09J 11/06; C09J 4/00; C09J 133/14; Y10T 428/31551; Y10T 428/31935; C08F 220/18; C08K 5/405; B32B 7/12
See application file for complete search history.

(56) References Cited

U.S. PATENT DOCUMENTS

| | | | |
|---|---|---|---|
| 3,218,305 A | | 11/1965 | Krieble |
| 3,991,008 A | * | 11/1976 | Temin et al. ............... 523/115 |

(Continued)

FOREIGN PATENT DOCUMENTS

| | | | |
|---|---|---|---|
| CA | 1336600 | * | 8/1995 |
| EP | 2230280 | | 9/2010 |

(Continued)

OTHER PUBLICATIONS

D.T. Elmore and J.R. Ogle; "Acyl isothiocyanates. Part II. Reactions of aroyl isothiocyanates with amines and amino-acids in aqueous solution;" Journal of the Chemical Society; 1958; 1141-1145.*

(Continued)

*Primary Examiner* — Kevin R Kruer
(74) *Attorney, Agent, or Firm* — Steven C. Bauman

(57) ABSTRACT

Benzoylthiourea or benzoylthiourethane derivatives as cure accelerators for two part curable compositions are provided.

6 Claims, 3 Drawing Sheets

(51) Int. Cl.
*C09J 133/14* (2006.01)
*C09J 4/00* (2006.01)
*C08F 220/18* (2006.01)
*C08K 5/405* (2006.01)

(56) References Cited

U.S. PATENT DOCUMENTS

| | | | | |
|---|---|---|---|---|
| 4,039,705 | A | * | 8/1977 | Douek ................ C09J 4/06 156/331.7 |
| 4,180,640 | A | | 12/1979 | Melody et al. |
| 4,287,330 | A | | 9/1981 | Rich |
| 4,321,349 | A | | 3/1982 | Rich |
| 4,554,301 | A | * | 11/1985 | Dohi .................. C08F 290/048 524/210 |
| 4,569,976 | A | * | 2/1986 | Zimmerman ............ C09J 4/00 526/204 |
| 5,605,999 | A | | 2/1997 | Chu et al. |
| 6,043,327 | A | | 3/2000 | Attarwala |
| 7,537,839 | B1 | | 5/2009 | Attarwala et al. |
| 2006/0189728 | A1 | * | 8/2006 | Qian ................ A61K 6/0023 524/99 |
| 2007/0040151 | A1 | * | 2/2007 | Utterodt et al. ......... 252/182.13 |
| 2009/0048364 | A1 | * | 2/2009 | Liu ................ A61K 6/0023 522/48 |
| 2010/0065210 | A1 | | 3/2010 | Schuft et al. |
| 2010/0249266 | A1 | | 9/2010 | Yarimizu et al. |
| 2012/0059083 | A1 | * | 3/2012 | Tokui et al. ................ 523/118 |

FOREIGN PATENT DOCUMENTS

| | | |
|---|---|---|
| JP | 53-41330 A | 4/1978 |
| JP | S6234972 | 2/1987 |
| JP | 7-150113 A | 6/1995 |
| JP | 11-189749 A | 7/1999 |
| JP | 2011241342 | 12/2011 |
| WO | 2007016508 | 2/2007 |

OTHER PUBLICATIONS

Acta Crystallographica, Section E "N-(3-Octyl-4-oxo-1,3-thiazolidin-2-yl-idene)Benzamide" Hua-Rong Zhao, Hai-Yan Wang and Xiang-Wu Meng; o3285 (2010).*

Rich, "Anaerobic Adhesives", Handbook of Adhesive Technology, 29, 467-79, A. Pizzi and K.L. Mittal, eds., Marcel Dekker, Inc., New York (1994), pp.

* cited by examiner

ACCELERATORS FOR TWO PART CURABLE COMPOSITIONS

BACKGROUND

Field

Benzoylthiourea or benzoylthiourethane derivatives as accelerators for two part curable compositions are provided.

Brief Description Of Related Technology

Curable adhesive and sealant compositions oftentimes rely on curatives to make them commercially attractive options for end users. Curable adhesive and sealant compositions come in one part formats, two part formats and two step formats depending on the performance profile they are designed to meet and the constituents used to prepare the compositions. Anaerobic adhesives are prominent one part compositions and generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Anaerobic cure-inducing compositions ordinarily used in commercial anaerobic adhesive and sealant compositions to induce and accelerate cure ordinarily include saccharin, toluidines, such as N,N-diethyl-p-toluidine ("DE-p-T") and N,N-dimethyl-o-toluidine ("DM-o-T"), acetyl phenylhydrazine ("APH"), maleic acid, and quinones, such as napthaquinone and anthraquinone. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

GC Corporation submitted to the U.S. Patent and Trademark Office a patent application, which published as U.S. Patent Application Publication No. 2010/0249266, and is directed to a polymerizable composition comprising a first paste and a second paste, where the first paste comprises a polymer of α, β unsaturated monocarboxylic acid or α, β unsaturated dicarboxylic acid, water, and a hydroperoxide as a peroxide, and where the second paste comprises a (meth) acrylate compound not having an acid group, fluoroaluminosilicate glass powder, a thiourea derivative as a reducing material, and a vanadium compound as a polymerization accelerator.

Notwithstanding the state of the technology, there is an on-going desire to find alternative technologies for accelerating the cure of curable compositions to differentiate existing products and provide supply assurances in the event of shortages or cessation of supply of raw materials. Accordingly, it would be desirable to identify new materials, which function as accelerators for curable compositions.

SUMMARY

The inventive two part curable compositions made with the benzoylthiourea or benzoylthiourethane derivatives are useful as adhesives or sealants, particularly in two part curable compositions, such as compositions curable by exposure to anaerobic conditions.

For instance, the benzoylthiourea or benzoylthiourethane derivatives may be within general structure I

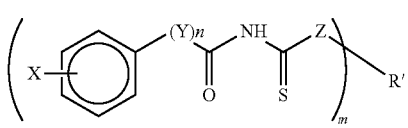

where Z is O or N—R, where R is selected from hydrogen, alkyl, alkenyl, hydroxyalkyl, hydroxyalkenyl, carbonyl, alkylene (meth)acrylate, carboxyl, or sulfonato, or R' is a direct bond attaching to the phenyl ring; R' is selected from hydrogen, alkyl, alkenyl, cycloalkyl, aryl, hydroxyalkyl, hydroxyalkenyl, alkylene- or alkenylene-ether, carbonyl, alkylene (meth)acrylate, carboxyl, nitroso or sulfonato; X is halogen, alkyl, alkenyl, hydroxyalkyl, hydroxyalkenyl, alkoxy, amino, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

A more specific general structure is shown below:

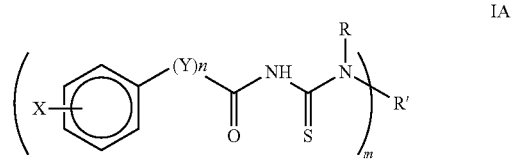

where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

More specifically, the benzoylthiourea or benzoylthiourethane derivatives may be within structures II or IIA, respectively

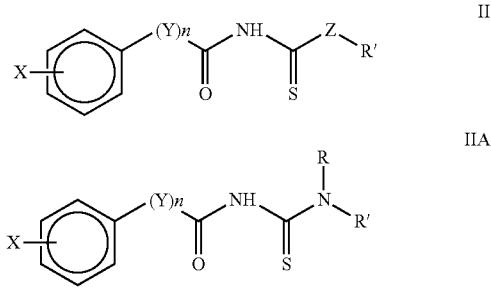

where R, R', Z, X, Y, and n are as defined above.

More specific examples of the benzoylthiourea or benzoylthiourethane derivatives within structures II and IIA, respectively, are set forth below

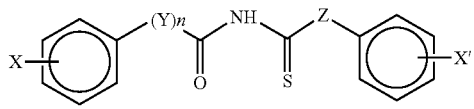

III

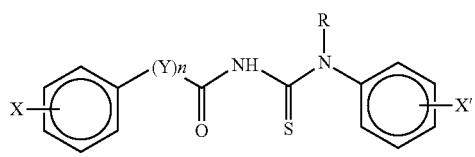

IIIA where R, X, Y, Z, and n are as defined above, and X' is defined as X.

Alternatively, the benzoylthiourea or benzoylthiourethane derivatives within structure I may be a bis version, where R' is a linker. That is,

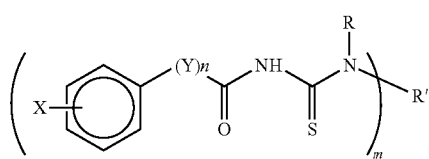

IV where R, R', X, Y, and n are as defined above, and m is 2.

The benzoylthiourea or benzoylthiourethane derivatives act to accelerate cure of the two part curable compositions and provide compositions with good cure through volume. The present invention will be more fully appreciated by a reading of the "Detailed Description", and the illustrative examples which follow thereafter.

DETAILED DESCRIPTION

Figure 1:
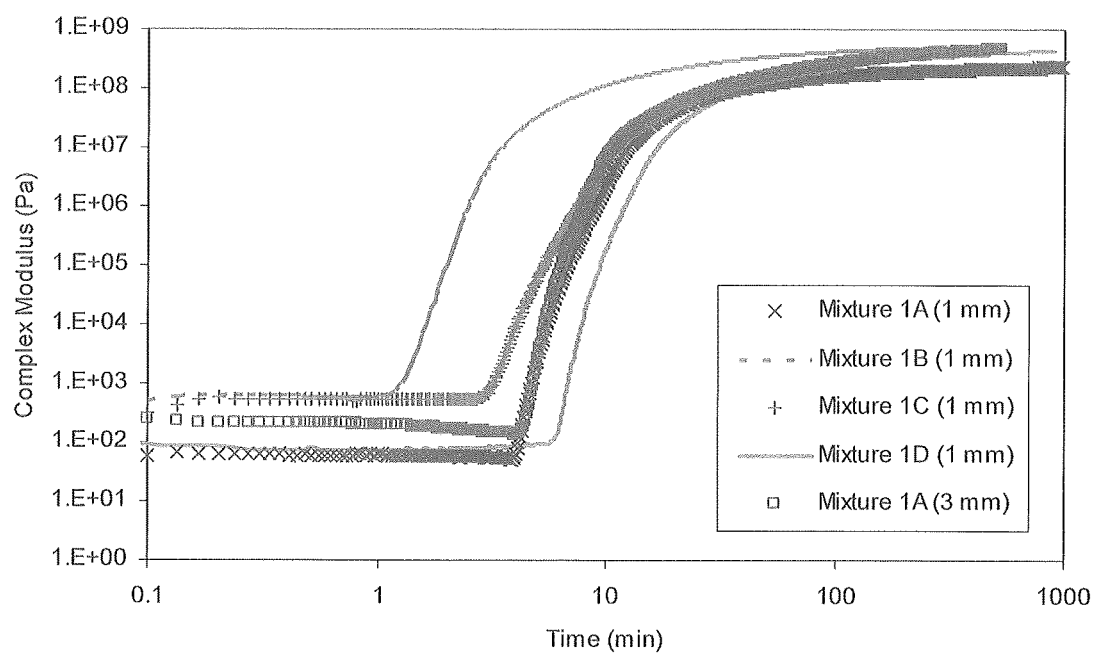
FIG. 1 depicts a rheometry plot of complex shear modulus versus time of Sample Nos. 1-4.

Here, two part curable compositions use as a component thereof the inventive cure accelerators within structure I

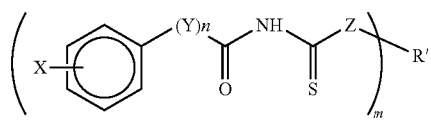

I where Z is O or N—R, where R is selected from hydrogen, alkyl, alkenyl, aryl, hydroxyalkyl, hydroxyalkenyl, alkylene (meth)acrylate, carbonyl, carboxyl, or sulfonato, R' is a member selected from the group consisting of hydrogen, alkyl, alkenyl, aryl, hydroxyalkyl, hydroxyalkenyl, alkylene (meth)acrylate, carbonyl, carboxyl, or sulfonate, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

As noted above, a more specific general structure is shown below:

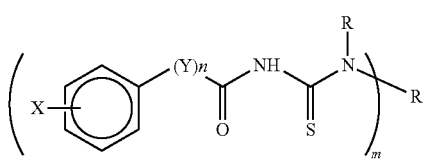

IA where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

More specifically, the inventive cure accelerators may be within structures II and IIA respectively

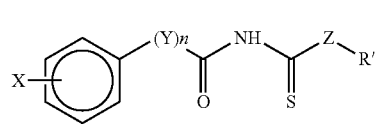

II

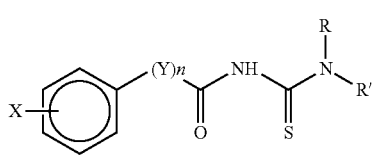

IIA where R, R', X, Y, and n are as defined above.

More specific example of the inventive cure accelerators within structures II and IIA are set forth below

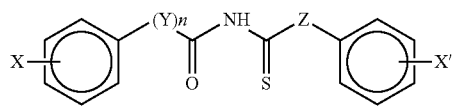

III

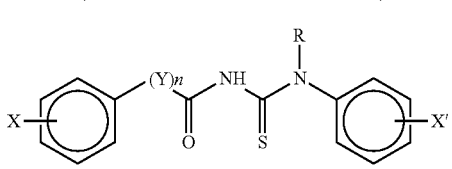

IIIA where R, X, Y, and n are as defined above, and X' is defined as X.

And even more specifically, the inventive cure accelerators include

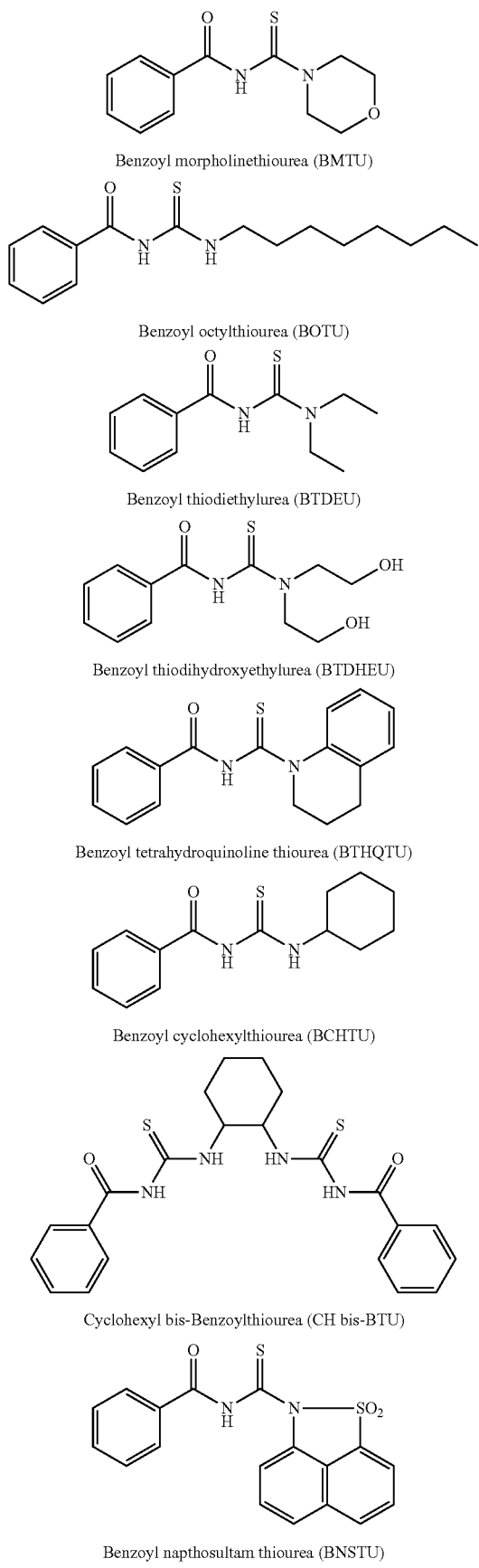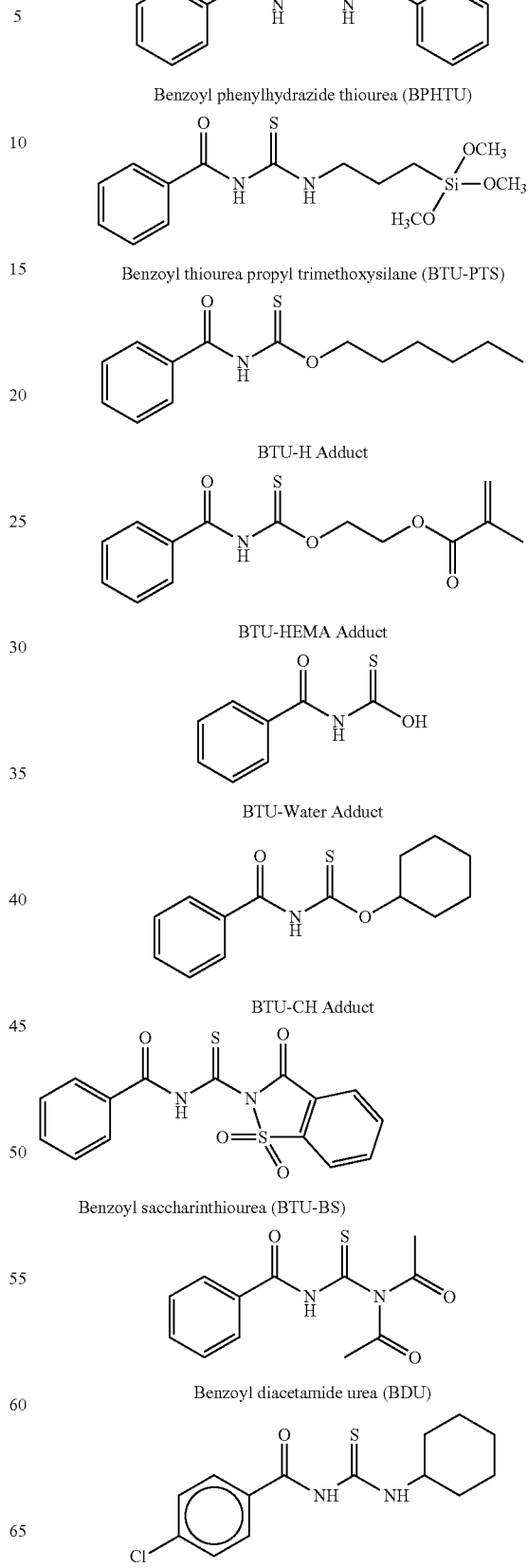

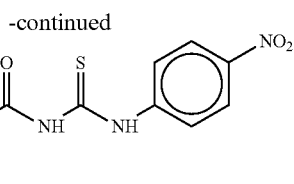

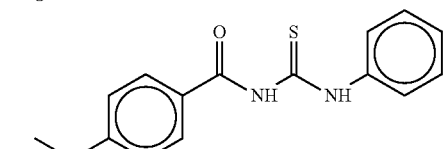

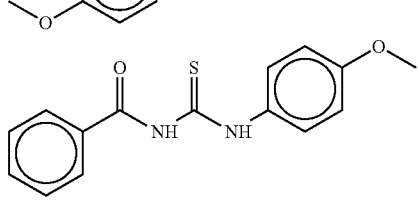

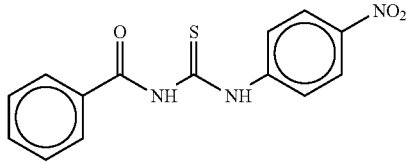

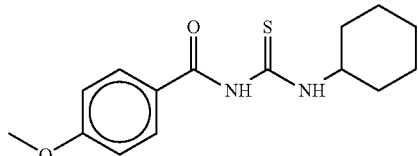

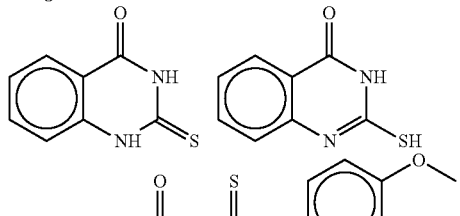

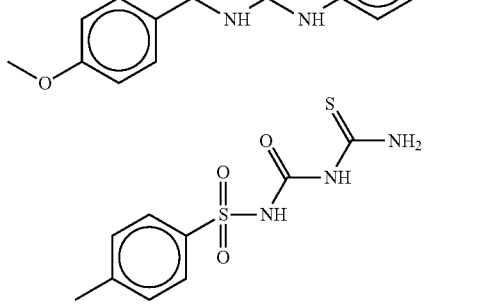

Benzoylthiourea or benzoylthiourethane derivatives thus are useful as a cure accelerator in two part curable compositions. The benzoylthiourea or benzoylthiourethane derivatives display good solubility, stability and/or activity as cure accelerators in curable compositions.

Indeed, in the context of anaerobic curable compositions, which generally are based on a (meth)acrylate component together with an anaerobic cure-inducing composition, cure accelerators are provided for use in an anaerobic cure-inducing composition. In the case here, the cure accelerator would be the benzoylthiourea or benzoylthiourethane derivatives. The addition of such compounds as cure accelerators into anaerobic curable compositions as a replacement for some or all of the amount of conventional cure accelerators (such as APH), surprisingly provides at least comparable cure speeds and physical properties for the reaction products formed.

In one aspect, the invention provides a two part curable composition, comprising:

Part A: one or more compounds within structures I or IA below:

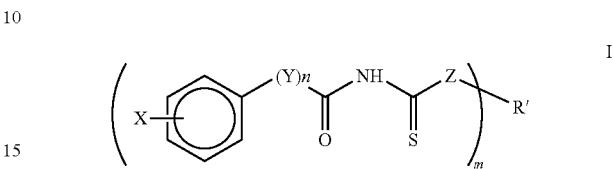

where Z is O or N—R, where R is selected from hydrogen, alkyl, alkenyl, aryl, hydroxyalkyl, hydroxyalkenyl, alkylene (meth)acrylate, carbonyl, carboxyl, or sulfonato, R' is a member selected from the group consisting of hydrogen, alkyl, alkenyl, aryl, hydroxyalkyl, hydroxyalkenyl, alkylene (meth)acrylate, carbonyl, carboxyl, or sulfonate, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, or

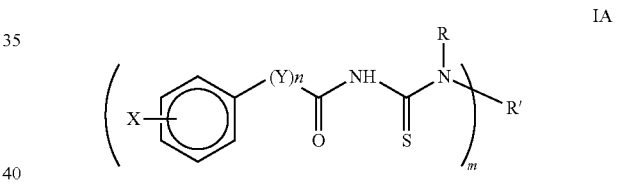

where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, sulfonate, hydroxyl or haloalkyl; and Y is —SO$_2$NH—, —CONH—, —NH—, and —PO(NHCONHCSNH$_2$)NH—; and n is 0 or 1 and m is 1 or 2; and Part B: an oxidant, where at least one of Part A or Part B comprises a (meth)acrylate component.

(Meth)acrylate monomers suitable for use as the (meth)acrylate component in the curable compositions may be chosen from a wide variety of materials, such as these represented by H$_2$C=CGCO$_2$R$^1$, where G may be hydrogen or alkyl groups having from 1 to about 4 carbon atoms, and R$^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di-or tri-functional (meth) acrylates like polyethylene glycol di(meth)acrylates, tetrahydrofuran(meth)acrylates and di(meth)acrylates, hydroxypropyl (meth)acrylate ("HPMA"), hexanediol di(meth) acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol)dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

Additional components may be included in traditional curable compositions to alter the physical properties of either the curable compositions or the reaction products thereof.

For instance, one or more of maleimide components, thermal resistance-conferring coreactants, diluent components reactive at elevated temperature conditions, mono- or poly-hydroxyalkanes, polymeric plasticizers, and chelators (see U.S. Pat. No. 6,043,327, the disclosure of which is hereby expressly incorporated herein by reference) may be included to modify the physical property and/or cure profile of the formulation and/or the strength or temperature resistance of the cured adhesive.

When used, the maleimide, coreactant, reactive diluent, plasticizer, and/or mono- or poly-hydroxyalkanes, may be present in an amount within the range of about 1 percent to about 30 percent by weight, based on the total weight of the composition.

The two part curable compositions may also include other conventional components, such as free radical initiators, other free radical co-accelerators, inhibitors of free radical generation, as well as metal catalysts, such as iron and copper. Depending on the cure environment some or all of these components might ordinarily be used, particularly if cure is to occur under anaerobic conditions.

A number of well-known initiators of free radical polymerization (or, oxidants) are typically incorporated into the curable compositions including, without limitation, hydroperoxides, such as cumene hydroperoxide ("CHP"), paramenthane hydroperoxide, t-amyl hydroperoxide, 1,1,3,3-tetramethylbutyl hydroperoxide and t-butyl hydroperoxide ("TBH"). Other peroxides include t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

It may be desirable in some instances to provide the oxidant in an encapsulated form.

Such oxidants are typically employed in the range of from about 0.1 to about 10 percent by weight, based on the total weight of the composition, with about 1 to about 5 percent by weight being desirable.

Stabilizers and inhibitors (such as phenols including hydroquinone and quinones) may also be employed to control and prevent premature oxidant decomposition and polymerization of the curable compositions.

The benzoylthiourea or benzoylthiourethane derivatives may be used as cure accelerators in amounts of about 0.1 to about 5 percent by weight, such as about 1 to about 2 percent by weight, based on the total weight of the composition. When used in combination with conventional accelerators (though at lower levels as comparted to such conventional accelerators), particularly anaerobic curable compositions, the benzoylthiourea or benzoylthiourethane derivatives should be used in amounts of about 0.01 to about 5 percent by weight, such as about 0.02 to about 2 percent by weight.

Other agents such as thickeners, non-reactive plasticizers, fillers, toughening components (such as elastomers and rubbers), and other well-known additives may be incorporated therein where the art-skilled believes it would be desirable to do so.

Also provided are methods of preparing and using the inventive curable compositions, as well as reaction products of the compositions.

The curable compositions may be prepared using conventional methods which are well known to those persons of skill in the art. For instance, the components of the curable compositions may be mixed together in any convenient order consistent with the roles and functions the components are to perform in the compositions. Conventional mixing techniques using known apparatus may be employed.

The two part curable compositions may be applied to a variety of substrates to perform with the desired benefits and advantages described herein. For instance, appropriate substrates may be constructed from steel, brass, copper, aluminum, zinc, glass and other metals and alloys, ceramics and thermosets.

The invention also provides a process for preparing a reaction product from the two part curable composition, steps of which include applying the two part curable composition to a desired substrate surface and exposing the two part curable composition to appropriate conditions for a time sufficient to cure the composition.

This invention also provides a method of using as an accelerator for two part curable compositions the so-described benzoylthiourea or benzoylthiourethane derivatives.

And the present invention provides a bond formed between two mated substrates with the two part curable composition using the so-described benzoylthiourea or benzoylthiourethane derivatives.

In view of the above description, it is clear that a wide range of practical opportunities is provided. The following examples are provided for illustrative purposes only, and are not to be construed so as to limit in any way the teaching herein.

EXAMPLES

Many of the so-described benzoylthiourea or benzoylthiourethane derivatives were synthesized as set forth below.

A. Syntheses

Benzoyl Isothiocyanate

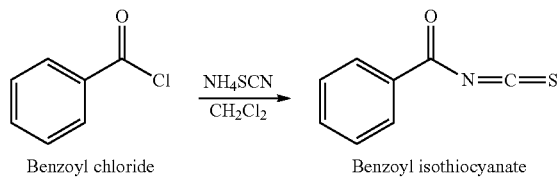

Benzoyl isothiocyanate was prepared as a starting material for benzoyl thiourea and derivatives thereof. In a 500 mL three-neck round-bottom flask ("RBF"), fitted with a condenser, thermo-probe, sealed system nitrogen purge, pressure-equilibrated addition funnel and mechanical stirrer, were placed solid ammonium thiocyanate (16.9 g, 0.22 mol) and dichloromethane (100 mL). The stirred mixture was cooled in an ice-water bath to a temperature of about 10-15° C. To the stirred mixture was added a solution of benzoyl chloride (28.4 g, 0.2 mol) in dichloromethane (50 mL) over a period of time of 20 minutes and the reaction mixture was warmed to a temperature near reflux (39° C.) for a period of time of 1 hour. Reaction completion was confirmed by FT-IR analysis. The solution was then cooled to a temperature of about 10-15° C. The solution can be concentrated to an oil to provide the benzoyl isothiocyanate. A boiling point of 128-131° C. at 15 mm Hg was measured.

FT-IR, ATR-Accessory, 3063 cm$^{-1}$ (aromatic C—H), 2000-1921 (—NCS aromatic isothiocyanate), 1685 (carbonyl), 1230 (—C—N—), 846 (aromatic thioisocyanate).

$^1$H NMR—DMSOd$_6$, δ 8.05 (s, multiplet, aromatic H), 7.70 (s, triplet, aromatic H), 7.50 (s, triplet, aromatic H).

$^{13}$C NMR—DMSOd$_6$, δ 161.0 (s, singlet, Ar—CO—), 148.0 (s, singlet, —NCS), 135.0 (m, singlet, aromatic C), 130.0 (s, singlet, aromatic C), 128.0 (s, singlet, aromatic C).

Benzoylthiourea

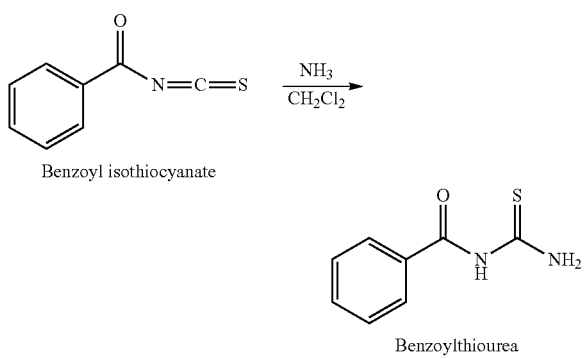

The RBF was changed to include a sealed glass-fritted bubbler system connected to an ammonia gas supply and an exit bubbler-scrubber system. To the clear cold reaction mixture (controlled at a temperature below 30° C. with an external ice-water bath) was slowly purged ammonia gas. During the addition, ammonia was consumed and the reaction mixture slowly became pale and cloudy/milky in appearance. The mixture was allowed to warm to room temperature, and stirring continued for an additional hour after ammonia addition ceases. Nitrogen gas was then re-introduced into the system to purge residual ammonia gas. The resulting solid is collected by vacuum filtration and washed with additional dichloromethane to provide a slightly yellow solid, which was recrystallized from ethanol. The solid was then dried to a constant weight in vacuo at a temperature of 50° C. and a pressure of <1 mTorr. The resulting solid was observed to have a melting point of 171.62° C., as determined by DSC.

FT-IR, ATR-Accessory, 3301-3146 cm$^{-1}$ (—NH$_2$ and —NH—), 1675 (carbonyl), 1599, 1526 and 1403 (—NCSN—), 1233 (—C—N—).

$^1$H NMR—DMSOd$_6$, δ 11.1 ppm (m, singlet, —NH—), 9.90 and 9.55 (m, doublet, —NH$_2$), 7.90 (s, doublet, aromatic H), 7.60-7.40 (s, multiplet, aromatic H), 3.65 (s, singlet, solvent exchange).

$^{13}$C NMR—DMSOd$_6$, δ 187.5 ppm (NH—CS—NH$_2$), 173.5 (Ar—CO—), 139.0-132.0 (aromatic C).

Benzoyl Thiourea Adducts Made From Amine- or Nitrogen-containing Compounds

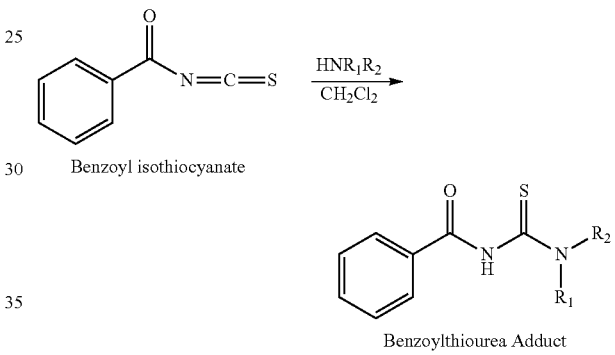

Benzoyl Morpholine Thiourea ("BMTU") Adduct

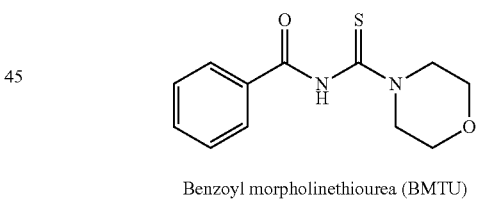

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point morpholine (13.21 g, 0.150 mol) and dichloromethane (100 mL) were added slowly over a period of time of about 30 minutes. The ice-water bath was removed and the reaction mixture was stirred overnight under a nitrogen purge. The reaction mixture was then concentrated in vacuo at a temperature of 40° C. to provide a crude yellow solid. The solid was recrystallized from refluxing ethyl acetate (50 mL) to provide a yellow solid that was dried to constant weight in vacuo at a temperature of 50° C. and a pressure of <1 mTorr in a 82% yield. The solid was determined to have a melting point of 138° C.

Benzoyl Octyl Thiourea ("BOTU") Adduct

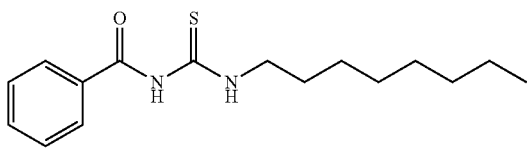

Benzoyl octylthiourea (BOTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath to a temperature of below 5° C., at which point octylamine (19.6 g, 0.150 mol) and dichloromethane (100 mL) was added slowly over a period of time of 30 minutes. The ice-water bath was removed and the reaction mixture was stirred at room temperature under a nitrogen purge overnight. The reaction mixture was washed with water, and the organic layer separated, dried with anhydrous magnesium sulfate, filtered and concentrated in vacuo at a temperature of 40° C. to provide an orange oil. The oil was dried to constant weight in vacuo at a temperature of 50° C. and a presence of <1 mTorr in a 95% yield.

Benzoyl Thiodiethylurea ("BTDEU") Adduct

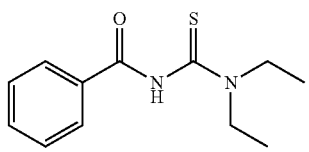

Benzoyl thiodiethylurea (BTDEU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point diethylamine (15.0 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide an orange-yellow solid. The solid was dried to constant weight in vacuo at a temperature of 50° C. and a pressure of <1 mTorr in a 99% yield.

Benzoyl Thiodihydroxyethylurea ("BTDHEU") Adduct

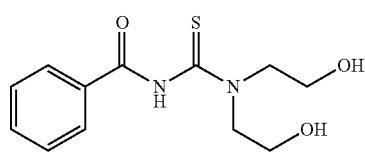

Benzoyl thiodihydroxyethylurea (BTDHEU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point dihydroxyethylamine (15.9 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a white solid. The solid was dried to constant weight in vacuo at a temperature of 50° C. and a pressure of <1 mTorr in a 97% yield.

Benzoyl Tetrahydroquinoline Thiourea ("BTHQTU") Adduct

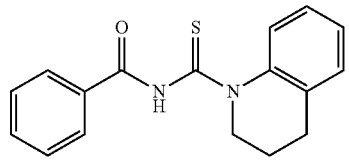

Benzoyl tetrahydroquinoline thiourea (BTHQTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point tetrahydroquinoline (20.4 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a white solid. The solid was dried to constant weight in vacuo at a temperature of 50° C. and a pressure of <1 mTorr in a 93% yield. The solid was determined to have a melting point of 143.6° C.

Benzoyl Cyclohexylthiourea ("BCHTU") Adduct

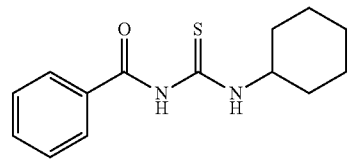

Benzoyl cyclohexylthiourea (BCHTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point cyclohexylamine (15.0 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide an orange-yellow solid. The solid was dried to constant weight in vacuo at a temperature of 50° C. and a pressure of <1 mTorr in a 99% yield. The solid was determined to have a melting point of 67.8° C.

Cyclohexyl Bis-Benzoylthiourea ("CHbisBTU") Adduct

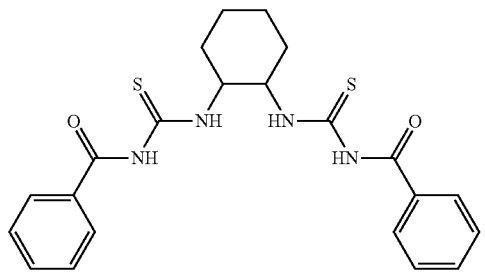

Cyclohexyl bis-Benzoylthiourea (CH bis-BTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point benzoyl isothiocyanate (50.0 g, 0.300 mol) and cyclohexyldiamine (17.42 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide an orange-yellow solid. The solid was dried to constant weight in vacuo at a temperature of 50° C. and a pressure of <1 mTorr in a 99% yield.

Benzoyl Naphthosultamthiourea ("BNSTU") Adduct

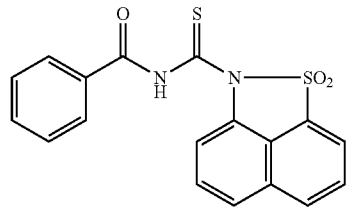

Benzoyl napthosultam thiourea (BNSTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point naphthosultam (31.4 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a brown solid. The brown solid was recrystallized from refluxing ethyl acetate (150 mL) to provide a tan solid that was dried to constant weight in vacuo at a temperature of 50° C. and a pressure of <1 mTorr in a 77% yield. The resulting solid was observed to have a melting point of 264° C.

Benzoyl Phenylhydrazinethiourea ("BPHTU") Adduct

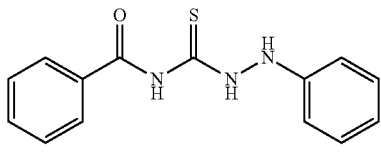

Benzoyl phenylhydrazide thiourea (BPHTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point phenylhydrazine (16.7 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a white solid. The solid was dried to constant weight in vacuo at a temperature of 50° C. and a pressure of <1 mTorr in a 97% yield.

Benzoyl Thiourea Propyltrimethoxysilane ("BTU-TMS") Adduct

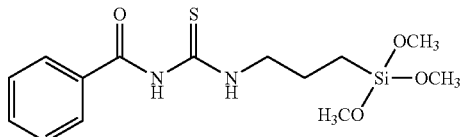

Benzoyl thiourea propyl trimethoxysilane (BTU-PTS)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The reaction mixture was cooled in an ice-water bath to a temperature below 5° C., at which point 3-aminopropyl trimethoxysilane (27.7 g, 0.150 mol) and dichloromethane (100 mL) were added slowly over a period of time of 30 minutes. The ice-water bath was removed and the reaction mixture was stirred at room temperature under a nitrogen purge overnight. The reaction mixture was then concentrated in vacuo at a temperature of 40° C. to provide a clear red liquid. The liquid was dried to constant weight in vacuo at a temperature of 50° C. and a pressure of <1 mTorr in a 97% yield.

Benzoyl Thiourea JEFFAMINE ("BTU-JEFFAMINE") Adduct

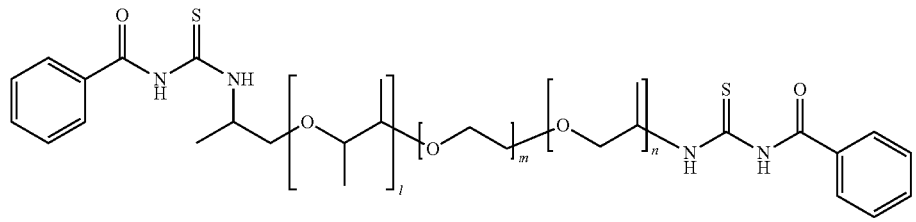

BTU Jeffamine ED-900 Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The reaction mixture was cooled in an ice-water bath to a temperature below 5° C., at which point JEFFAMINE ED-900 (67.5 g, 0.075 mol) and dichloromethane (100 mL) was added slowly over a period of time of 30 minutes. JEFFAMINE ED-900, according to the manufacturer Huntsman Corporation, Woodlands, Tex., is a polyether diamine based on a predominantly PEG backbone, with a molecular weight of 900. In the structure given above, l is about 12.5, and m+n is about 6.

The ice-water bath was removed and the reaction mixture was stirred at room temperature under a nitrogen purge overnight. The cloudy solution was then concentrated in vacuo at a temperature of 40° C. to provide a pale amber oil. The liquid was dried to constant weight in vacuo at a temperature of 50° C. and a pressure of <1 mTorr in a 99% yield.

Benzoyl Saccharin Thiourea ("BSTU") Adduct

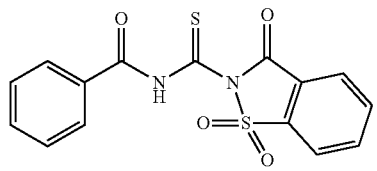

Benzoyl saccharinthiourea (BTU-BS)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) and saccharin (28.1 g, 0.150 mol) followed by dichloromethane (100 mL). The mixture was cooled in an ice-water bath at a temperature below 5° C., at which point water (28.1 g, 0.150 mol) and acetone as the solvent and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a solid that was dried to constant weight in vacuo at a temperature of 50° C. and a pressure of <1 mTorr in a 37% yield.

Benzoyl Diacetamide Thiourea ("BDTU") Adduct

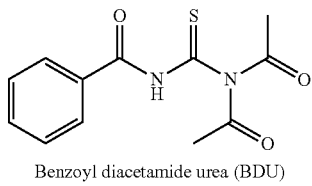 [SMILES: CC(=O)N(C(C)=O)C(=S)NC(=O)c1ccccc1]

Benzoyl diacetamide urea (BDU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point diacetamide (15.3 g, 0.150 mol) and acetone as the solvent and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. and then dried to constant weight in vacuo at a temperature of 50° C. and a pressure of <1 mTorr.

para-Toluene Sulfonyl Thiourea ("PTSITU") Adduct

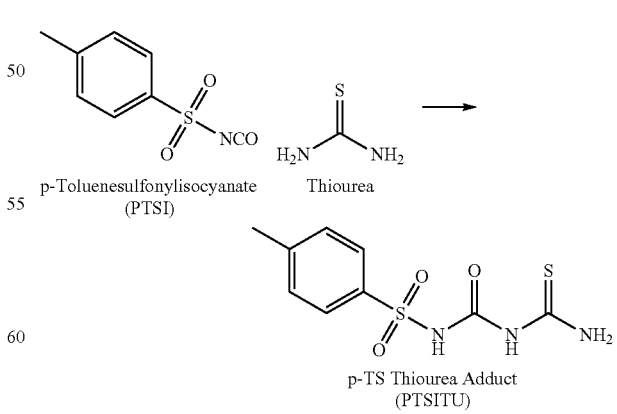

p-Toluenesulfonylisocyanate (PTSI)    Thiourea p-TS Thiourea Adduct (PTSITU)

In a 100 mL RBF equipped with a condenser, thermo-probe, sealed system nitrogen purge, pressure-equilibrated addition funnel and magnetic stirrer were placed thiourea (9.36 g, 0.12 mol) and dioxane (50 mL). The mixture was warmed to a temperature of 100° C. to encourage dissolution. The mixture was then cooled to a temperature of about 20° C., at which point para-toluenesulfonylisocyanate (25.0 g, 0.12 mol) was added slowly over a period of time of 1 hour. A milky-white suspension was observed to form. The temperature was maintained with an ice-water bath between 20° C. and 32° C. The reaction mixture was stirred overnight at room temperature before it was concentrated in vacuo at a temperature of 40° C. to yield a white solid that was further dried to constant weight in vacuo at a temperature of 50° C. and a pressure of <1 mTorr.

Benzoyl Dodecylthiourea ("BDDTU") Adduct

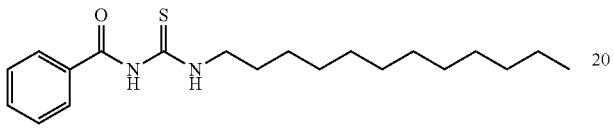

In a 250 mL 3-neck RBF equipped with a condenser, thermo-probe, sealed system nitrogen purge, pressure-equilibrated addition funnel and magnetic stirrer were placed benzoyl isothiocyanate (25.0 g, 0.150 mol) and ethyl acetate (100 mL). The mixture was cooled in an ice-water bath below 5° C., at which point melted dodecylamine (29.3 g, 0.150 mol) (m.p. 30° C.) and ethyl acetate (100 mL) was added slowly over a period of time of 0.5 hours. The ice-water bath was removed and the cloudy solution was stirred at 40° C. under nitrogen purge overnight. The organic phase was separated, washed with water, dried over anhydrous magnesium sulfate, filtered and concentrated in vacuo at a temperature of 40° C. to yield a yellow powdery solid. The solid was dried to constant weight in vacuo at 40° C. and <1 mTorr (99%).

Benzoyl Octadecylthiourea (BODTU) Adduct

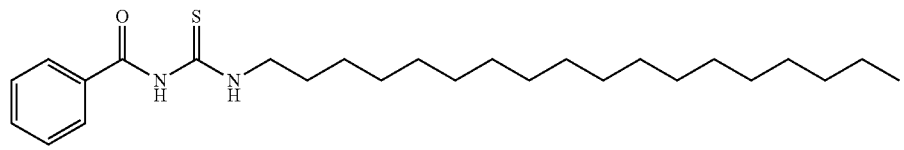 [SMILES: CCCCCCCCCCCCCCCCCCNC(=S)NC(=O)c1ccccc1]

In a 500 mL 3-neck RBF equipped with a condenser, thermo-probe, sealed system nitrogen purge, pressure-equilibrated addition funnel and magnetic stirrer were placed benzoyl isothiocyanate (16.07 g, 96.5 mol) and ethyl acetate (50 mL). The mixture was cooled in an ice-water bath below 5° C., at which point melted octadecylamine (26.5 g, 96.5 mol) (m.p. 55° C.) and ethyl acetate (50 mL) was added slowly over a period of time of 1 hour. The ice-water bath was removed and the cloudy solution was stirred at 50° C. under nitrogen purge overnight. The organic phase was separated, washed with water, dried over anhydrous magnesium sulfate, filtered and concentrated in vacuo at a temperature of 40° C. to yield a pale powdery (waxy) solid. The solid was dried to constant weight in vacuo at 40° C. and <1 mTorr (99%).

Benzoyl Thiourea Adducts Made From Hydroxyl-containing Compounds

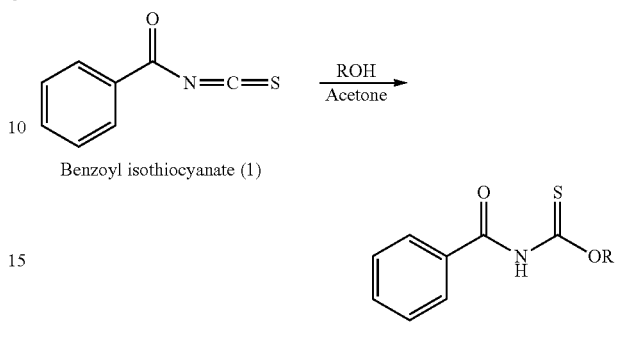

Benzoyl isothiocyanate (1)

Benzoyl Thiourea Hexanol ("BTU-H") Adduct

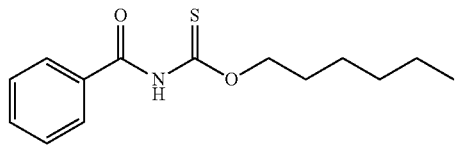

BTU-H Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point hexanol (15.5 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. to provide a yellow solid. The solid was dried to constant weight in vacuo at a temperature of 50° C. and a pressure of <1 mTorr in a 83% yield.

Benzoyl Thiourea Hydroxyethyl Methacrylate ("BTU-HEMA") Adduct

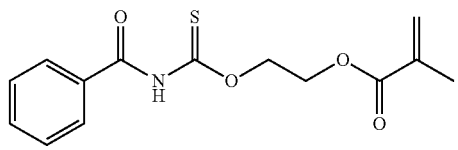

BTU-HEMA Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point hydroxyethyl methacrylate (19.5 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. to provide a pale yellow solid. The solid was dried to constant weight in vacuo at a temperature of 50° C. and a pressure of <1 mTorr in a yield of 77%.

Benzoyl Thiourea Water ("BTU-W") Adduct

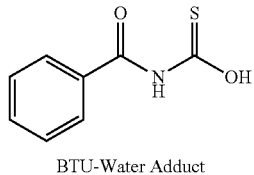 [SMILES: O=C(NC(O)=S)c1ccccc1]

BTU-Water Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point water (2.7 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. to provide a pale yellow solid. The solid was dried to constant weight in vacuo at a temperature of 50° C. and a pressure of <1 mTorr in a 36% yield.

Benzoyl Thiourea Cyclohexyl ("BTU-CH") Adduct

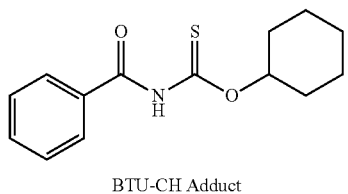 [SMILES: O=C(NC(=S)OC1CCCCC1)c1ccccc1]

BTU-CH Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point cyclohexanol (15.2 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. and then was dried to constant weight in vacuo at a temperature of 50° C. and a pressure of <1 mTorr.

B. Adhesive Formulations

Sample Nos. 1-4 were prepared from the noted Parts A and B in Table 1 below, with benzoyl thiourea ("BTU") as the thiourea ("TU"), in the following by weight ratios: 1:1 (3 grams), 1:1 (and 0.15 grams acrylic acid added to blend), 1:2 and 2:1.

TABLE 1

| Components | | Part/(Amt./wt %) | |
|---|---|---|---|
| Type | Identity | A | B |
| (Meth)acrylate | Proprietary Urethane Methacrylate | 78.4 | 78.4 |
| | Hydroxypropyl Methacrylate | 19.6 | 19.6 |
| Inventive Accelerator | TU | 2.0 | — |
| Free Radical Initiator | Cumene hydroperoxide | — | 2.0 |

Each sample was mixed in a DAC 400 FVZ speedmixer for 10 seconds at 2500 rpm. After mixing, each sample was loaded by pipette onto a Physica MCR301 rheometer having 8 mm diameter parallel plates. The cure profile of each mixture was measured as the change in complex shear modulus over time as the sample was oscillated under a nitrogen purge with 0.5% strain at a frequency of 30 rad/s. Each of Sample Nos. 1-4 was evaluated at an initial gap of 1.0 mm; in addition, Sample No. 1 was evaluated at a gap of 3.0 mm. Results are shown in FIG. 1.

Figure 2:
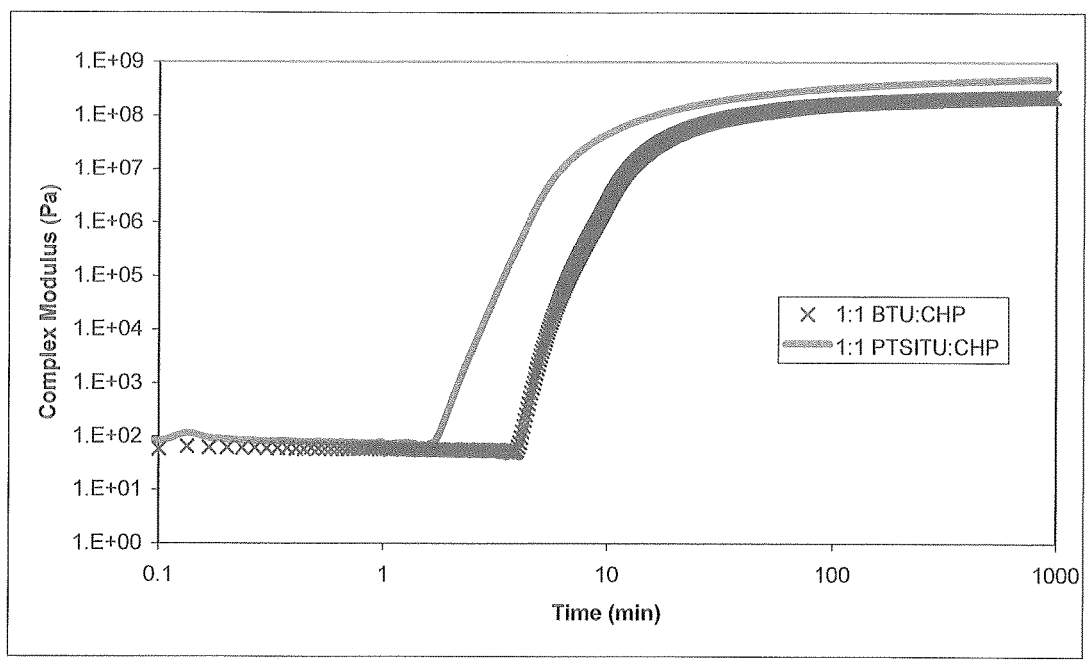
FIG. 2 depicts a rheometry plot of complex shear modulus versus time of Sample Nos. 1 and 5.

A 1:1 by weight ratio was prepared with PTSITU as the TU to form Sample No. 5. Sample No. 5 was evaluated on the rheometer at 1 mm gap, with Sample No. 1 used as a control. The modulus data, shown in FIG. 2, indicate that PTSITU provided for faster cure and comparable modulus when compared with BTU in this two-part adhesive composition.

Two two-part curable compositions (Sample Nos. 6 and 7) were prepared from the same Part B as follows:
Part A (1): 0.125 g BTU was added with stirring at room temperature to 1.172 g hydroxypropyl methacrylate to form a solution, which was then added to 4.745 g of a (meth) acrylate-functionalized elastomer.
Part A (2): 0.809 g PTSITU was added with stirring at room temperature to 7.850 g hydroxypropyl methacrylate to form a solution, which was then added to 31.405 g of a (meth) acrylate-functionalized elastomer.
Part B: 4.89 g of a (meth)acrylate-functionalized elastomer, 1.175 g hydroxypropyl methacrylate, and 0.129 g CHP were mixed together to form a homogeneous solution.

The two parts for each of the two two part curable compositions were combined in glass vials and mixed manually. The resulting compositions were loaded by pipette onto a Physica MCR301 parallel plate rheometer, equipped with a glass bottom plate and 8 mm diameter aluminum upper plate. Measurements were carried out at a temperature of 25° C. with a strain rate of 0.5%, angular frequency of 30 rad/s, initial gap of 1.0 mm, and fixed normal force of 0 N.

Figure 3:
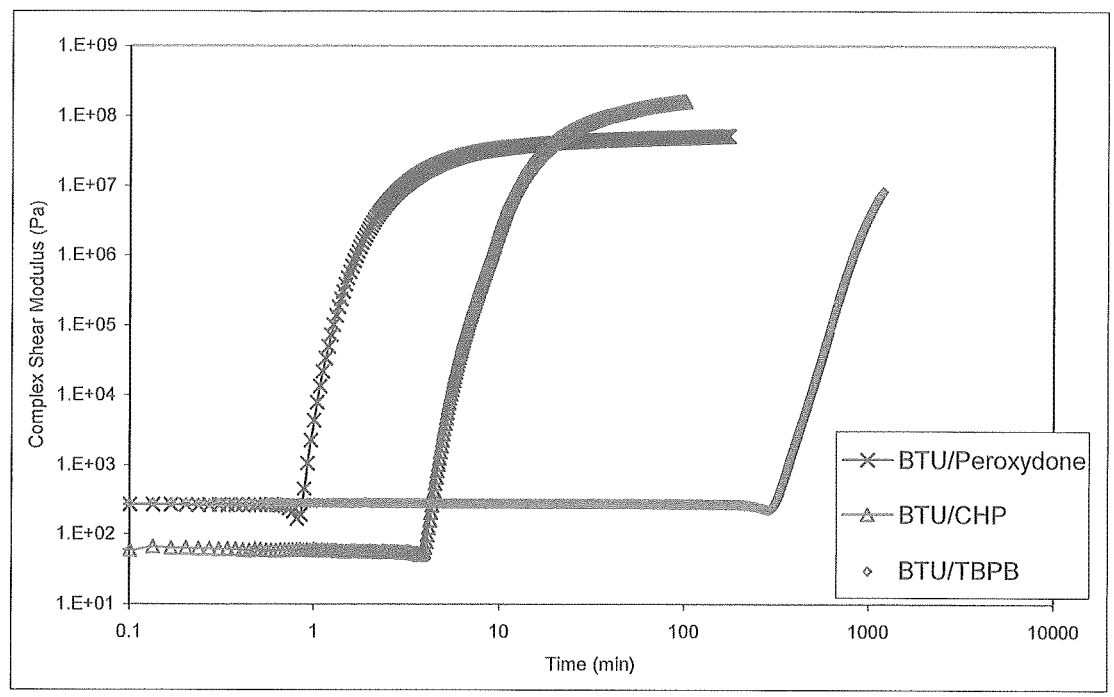
FIG. 3 depicts a rheometry plot of complex shear modulus versus time of Sample Nos. 8-10, where the oxidant was varied in each sample.

With reference to FIG. 3, the PTSITU had a shorter working time (i.e., less time before the onset of cure) than the BTU-containing sample. Both compositions cured to approximately the same final modulus, although PTSITU reached a plateau much faster than BTU, indicating that the two accelerators provide for about the same degree of degree of cure albeit at slightly different cure speeds.

Four premix compositions were prepared to evaluate three different peroxides, as shown below in Table 2.

TABLE 2

| Type | Components Identity | Pre-Mix/(Amt./wt %) | | | |
|---|---|---|---|---|---|
| | | I | II | III | IV |
| (Meth)acrylate | Proprietary Urethane Methacrylate | 79.8 | 79.8 | 79.8 | 79.8 |
| | Hydroxypropyl Methacrylate | 19.6 | 19.6 | 19.6 | 19.6 |
| Peroxide | CHP | — | — | — | 2 |
| | t-Butyl perbenzoate | — | 2 | — | — |
| | PEROXYDONE XL-10 | — | — | 2 | — |
| Inventive Accelerator | BTU | 2 | — | — | — |

Three two-part curable compositions were prepared from the premixes, where premix I was used as Part A in each and premix II-IV were used as Part B to form Sample Nos. 8-10, respectively.

Each Part A and Part B was mixed together at a 1:1 weight ratio for a period of time of 10 seconds at 2500 rpm in a DAC 400 FVZ speedmixer. The resulting compositions were loaded by pipette onto the Physica MCR301 parallel plate rheometer, equipped with a glass bottom plate and 8 mm or 12 mm diameter aluminum upper plate. Measurements were carried out at a temperature of 25° C. under a nitrogen purge, with a strain rate of 0.5%, angular frequency of 30 rad/s, initial gap of 1.0 mm, and fixed normal force of 0 N.

Reference to FIG. 3 shows that cure speed is dependent upon peroxide selection, with the PEROXYDONE XL-10-containing composition curing quickest and the t-butyl perbenzoate-containing composition curing slowest. As a practical application, that means the cure speed of a two-part curable composition containing the inventive accelerators in Part A can be tuned by the choice of peroxide in Part B.

What is claimed is:

1. A two part curable composition comprising:
Part A: a cure accelerator consisting of at least one of:

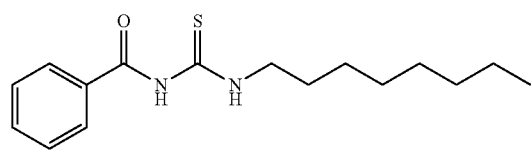

Benzoyl octylthiourea (BOTU)

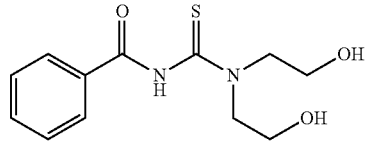

Benzoyl thiodihydroxyethylurea (BTDHEU)

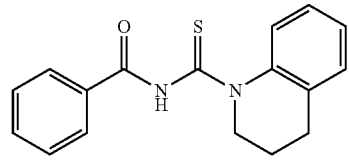

Benzoyl tetrahydroquinoline thiourea (BTHQTU)

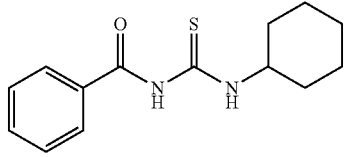

Benzoyl cyclohexylthiourea (BCHTU)

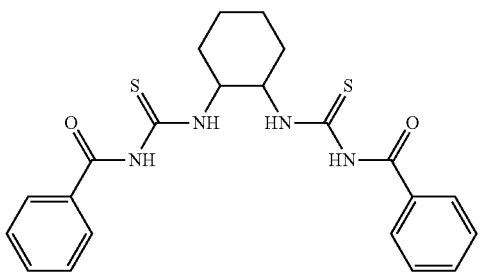

Cyclohexyl bis-Benzoylthiourea (CH bis-BTU)

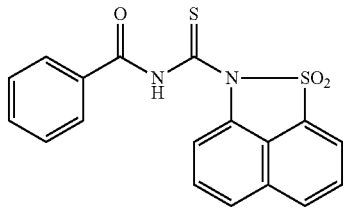

Benzoyl napthosultam thiourea (BNSTU)

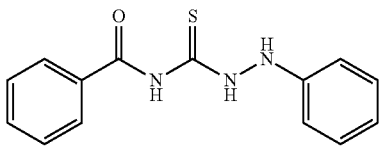

Benzoyl phenylhydrazide thiourea (BPHTU)

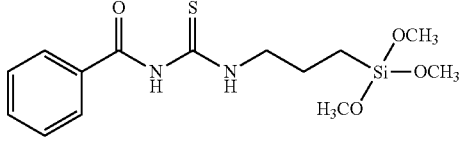

Benzoyl thiourea propyl trimethoxysilane (BTU-PTS)

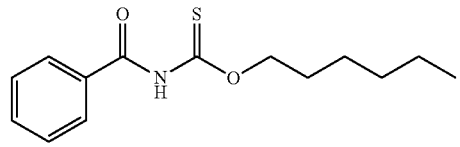

BTU-H Adduct

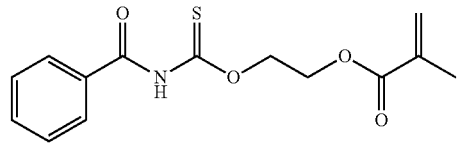

BTU-HEMA Adduct

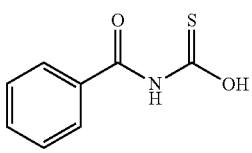

BTU-Water Adduct

-continued

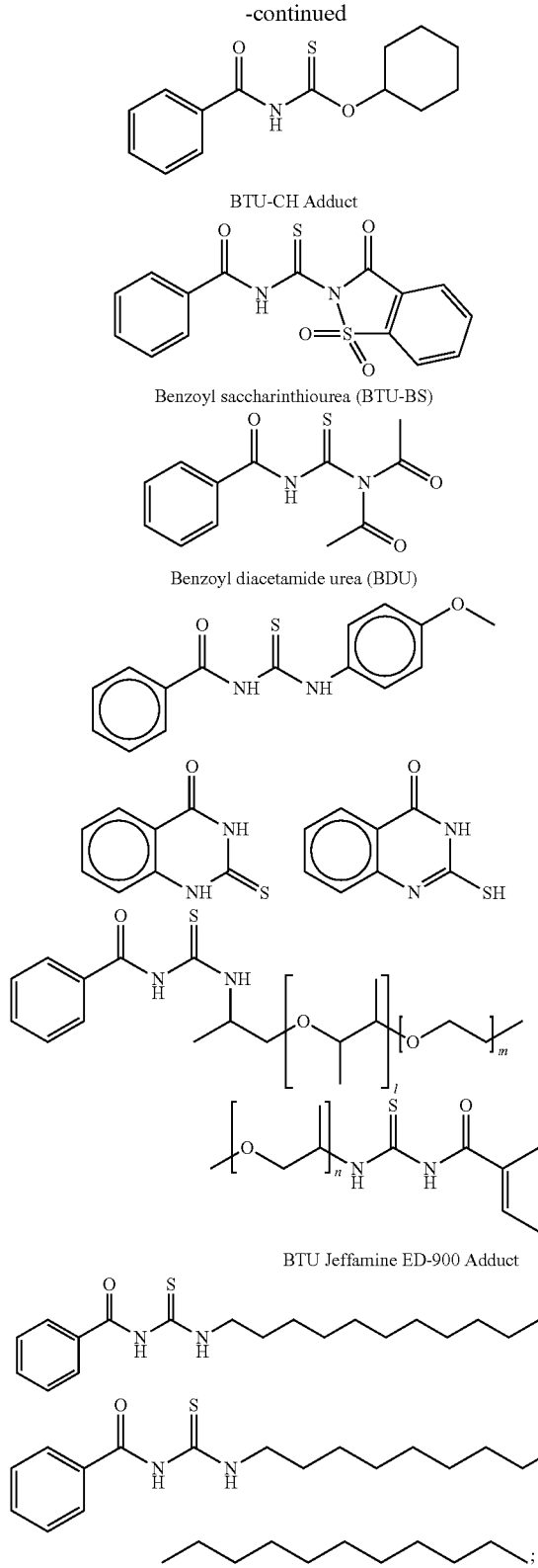

Part B: an oxidant,
wherein at least one of Part A or Part B further comprises a (meth)acrylate component.

2. A combination comprising a bond formed between two mated substrates with the composition of claim 1.

3. The composition of claim 1, wherein the (meth)acrylate component is within the general structure $H_2C=CGCO_2R^1$, wherein G may be hydrogen or alkyl groups having from 1 to about 4 carbon atoms, and $R^1$ may be a member selected from the group consisting of alkyl, cycloalkyl, alkenyl, cycloalkenyl, alkaryl, aralkyl, and aryl groups having from 1 to about 16 carbon atoms, any of which may be optionally substituted or interrupted as the case may be with the group consisting of silane, silicon, oxygen, halogen, carbonyl, hydroxyl, ester, carboxylic acid, urea, urethane, carbonate, amine, amide, sulfur, sulfonate, and sulfone.

4. The composition of claim 1, wherein the (meth)acrylate component is selected from the group consisting of polyethylene glycol di(meth)acrylates, tetrahydrofuran (meth)acrylates and di(meth)acrylates, hydroxypropyl (meth)acrylate, hexanediol di(meth)acrylate, trimethylol propane tri(meth)acrylate, diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, and bisphenol-F mono and di(meth)acrylates.

5. The composition of claim 1, wherein the oxidant is selected from the group consisting of cumene hydroperoxide, para-menthane hydroperoxide, t-amyl hydroperoxide, 1,1,3,3-tetramethylbutyl hydroperoxide, t-butyl hydroperoxide, t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane, and combinations thereof.

6. A two part curable composition comprising:
Part A: a cure accelerator consisting of one or more derivatives of benzoyl thiourea or thiourethane within structure I or IA below:

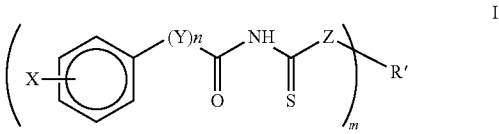

wherein Z is O or N—R, wherein R is a member selected from the group consisting of hydrogen, alkyl, alkenyl, hydroxyalkyl, hydroxyalkenyl, alkylene (meth)acrylate, carbonyl, carboxyl, or sulfonato, R' is a member selected from the group consisting of hydrogen, alkyl, alkenyl, aryl, hydroxyalkyl, hydroxyalkenyl, alkylene (meth)acrylate, carbonyl, carboxyl, or sulfonate, or R or R' is a direct bond attaching to the phenyl ring; wherein X is optional, but when X is present, X is a member selected from the group consisting of alkenyl, cycloalkyl, hydroxyalkyl, hydroxyalkenyl, amino, alkylene- or alkenylene-ether, alkylene (meth)acrylate, carbonyl, carboxyl, nitroso, sulfonate, hydroxyl or haloalkyl; and Y is a member selected from the group consisting of —SO$_2$NH—, —CONH—, —NH—, and —PO(NHCONHCSNH$_2$)NH—; and n is 0 or 1 and m is 1 or 2, or

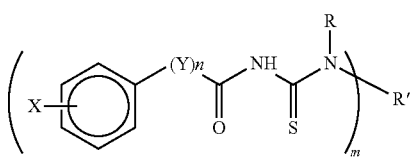

wherein R and R' are independent members selected from the group consisting of alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; wherein X is optional, but when X is present, X is a member selected from the group consisting of alkenyl, cycloalkyl, hydroxyalkyl, hydroxyalkenyl, amino, alkylene or alkenylene-ether, alkylene (meth)acrylate, carbonyl, carboxyl, sulfonate, hydroxyl or haloalkyl; and Y is a member selected from a group consisting of —SO$_2$NH—, —CONH—, —NH—, and —PO(NHCONHCSNH$_2$)NH—; and n is 0 or 1 and m is 1 or 2; and Part B: an oxidant selected from the group consisting of cumene hydroperoxide, para-menthane hydroperoxide, t-amyl hydroperoxide, 1,1,3,3-tetramethylbutyl hydroperoxide, t-butyl hydroperoxide, t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butylperoxyhex-3-yne, 4-methyl-2,2-di-t-butylperoxypentane, and combinations thereof, wherein at least one of Part A or Part B further comprises a (meth)acrylate component.

* * * * *